United States Patent
Kapaan et al.

(10) Patent No.: US 6,763,918 B1
(45) Date of Patent: Jul. 20, 2004

(54) ACTUATOR HAVING COMPACT GEAR REDUCTION

(75) Inventors: Hendrikus Jan Kapaan, Nieuwegein (NL); Jacobus Zwarts, Nieuwegein (NL); Simon Jan Broersen, Nieuwegein (NL)

(73) Assignee: SKF Engineering & Research Centre B.V., Nieuwegein (NL)

(*) Notice: Subject to any disclaimer, the term of this patent is extended or adjusted under 35 U.S.C. 154(b) by 0 days.

(21) Appl. No.: 09/937,776
(22) PCT Filed: Apr. 6, 2000
(86) PCT No.: PCT/NL00/00227
§ 371 (c)(1), (2), (4) Date: Oct. 12, 2001
(87) PCT Pub. No.: WO00/60255
PCT Pub. Date: Oct. 12, 2000

(30) Foreign Application Priority Data

Apr. 6, 1999 (NL) .............................. 1011731

(51) Int. Cl.[7] .............................................. F15D 55/08
(52) U.S. Cl. .................. 188/72.8; 188/71.9; 188/106 A
(58) Field of Search ........................... 188/72.8, 106 A, 188/156, 157, 71.8, 71.9

(56) References Cited

U.S. PATENT DOCUMENTS

| | | | |
|---|---|---|---|
| 2,881,619 A | | 4/1959 | Fox et al. |
| 2,953,934 A | | 9/1960 | Sundt |
| 3,788,430 A | * | 1/1974 | Harmon ...................... 188/72.8 |
| 4,598,801 A | * | 7/1986 | Villata ....................... 188/71.9 |
| 5,628,387 A | * | 5/1997 | Schantzen ................... 188/71.9 |
| 5,829,557 A | * | 11/1998 | Halasy-Wimmer et al. . 188/162 |
| 5,915,504 A | * | 6/1999 | Doricht ...................... 188/72.1 |
| 5,971,110 A | * | 10/1999 | Martin ....................... 188/72.1 |
| 6,089,359 A | * | 7/2000 | Tanaka ....................... 188/162 |
| 6,315,086 B1 | * | 11/2001 | Schmitt et al. ............. 188/72.7 |
| 6,325,180 B1 | * | 12/2001 | De Vries et al. ........... 188/72.1 |
| 6,367,592 B1 | * | 4/2002 | Kapaan et al. ............. 188/72.1 |
| 6,367,597 B1 | * | 4/2002 | De Vries et al. ........ 188/196 V |

FOREIGN PATENT DOCUMENTS

| | | | | |
|---|---|---|---|---|
| DE | 197 36 503 A1 | | 2/1999 | |
| DE | 19736503 A1 | * | 2/1999 | .......... B60T/11/04 |
| EP | 0 448 515 A1 | | 9/1991 | |
| WO | WO 9914516 A1 | * | 3/1999 | .......... F16D/65/16 |

* cited by examiner

Primary Examiner—Robert Siconolfi
(74) Attorney, Agent, or Firm—Oliff & Berridge, PLC

(57) ABSTRACT

A screw actuator comprises a housing (1), a nut (A) and a screw (16) one of which is axially fixed with respect to the housing and the other of which is axially displaceable with respect to the housing for moving an actuating head, as well as a motor (2) which comprises a stator (6) connected to the housing, and a rotor (7). The rotor (7) of the motor is supported rotatably on a sleeve (8), said sleeve has an inwardly directed flange (21), which carries an excentric hub (23). The excentric hub (23) rotatably supports a gear wheel (24) through bearing (30), the outer teeth of which gear wheel (24) engage the inwardly directed teeth of the ring gear (25). The ring gear (25) is driving screw (16) which is rotatably supported in the housing (1). The nut (17) of the screw mechanism (4) is slidably, but not rotatably with respect to the housing. Through the screwthreads (18, 19) and balls (20), the rotary motion of the screw (16) is converted into a linear motion of the nut (17), which is contained in a cylinder space (32) in the housing (1).

15 Claims, 2 Drawing Sheets

ACTUATOR HAVING COMPACT GEAR REDUCTION

The invention is related to an actuator, comprising a housing which contains a motor and a screw mechanism, said screw mechanism comprising a screw and a nut one of which is rotatably supported with respect to the housing, and a gear reduction mechanism connecting the rotor of the motor to the rotatable screw or nut.

Such actuator is generally known, and can be applied for various purposes such as for actuating a brake, a clutch etcetera. In many of these applications, it is desirable to have a large reduction between the motor and the object to be actuated, such as brake pads. On the other had, overall dimensions and weight should remain limited.

The screw mechanism itself provides a reduction which i.a. depends on the pitch of the threads. A small pitch however entails rather narrow thread, which in particular for ball screws would lead to small, vulnerable balls which moreover are difficult to handle.

The gear reduction means therefore preferably should provide a relatively large reduction, such that the screw mechanism can have coarser threads which provide a lower reduction of said screw mechanism itself.

In this respect, the prior art gear reduction mechanisms are not adequate. They comprises a ring gear, satellite wheels and a crown gear. Usually, two or more of these mechanisms are arranged in series so as to obtain the required reduction. The overall dimensions and weight are high.

The object of the invention is therefore to provide an actuator having a gear reduction means with a large reduction, and with relatively small dimensions and low weight. This object is achieved in that the gear reduction mechanism comprises at least a concentric gear ring with radially inwardly directed teeth, an excentrically positioned gear wheel having radially outwardly directed teeth wherein the outer diameter of the gear wheel is smaller than the inner diameter of the gear ring, such that the teeth of said gear wheel and gear ring engage each other along a part of their circumferences, and at an opposite part of their circumferences are out of engagement, said gear wheel being rotatable accommodated on a extentric hub which is connected to the rotor of the motor.

The reduction gear means according to the invention provides a large reduction as a result of the extentric position of the gear wheel and hub. Its dimensions arm small in thickness direction, leading to a compact embodiment.

Preferably, the gear ring is integrated with the screw of the screw mechanism, said screw being rotatably supported with relation to the housing.

Furthermore, a very compact actuator is obtained in case the rotor of the motor is rotatably supported on the outer ring of a support bearing, said outer ring being integrated with the screw and the gear ring.

By means of a radially inwardly extending flange, the rotor may be connected to the excentric hub.

Also, a positive back-drive mechanism is connected to the flange and the housing.

The actuator may be assembled from several sub assemblies such as a housing module, an actuator module and a gear reduction module.

According to a further embodiment, the housing hay have a bore accommodating at least the nut and/or the screw, and an axially fixed part of said nut or screw, supported with respect to a radial support abutment, which extends inwardly in the bore. In this embodiment, the rotor of the motor is supported rotatably on a sleeve, said sleeve engaging the fixed part and extending away from an actuator head which is movable in axial direction by means of the nut or the screw, said sleeve having a radially outwardly extending sleeve flange which is interposed between said support abutment, and the axially fixed part.

In particular, the flange of the sleeve is supported on an abutment surface of the support abutment, which faces the actuating head connected to the axially displaceable nut or screw for exerting a compressive force.

The rotor sleeve is now held firmly clamped between the radial support abutment and the axially fixed part of the nut or screw, which provides a simple, reliable construction. No additional fastening means are necessary for supporting the rotor sleeve.

In a practical embodiment, the nut is fixedly supported within the housing, said nut having a radially outwardly extending nut flange facing the outwardly extending sleeve flange and overlapping the inwardly extending actuator support abutment.

In service of the screw actuator according to the invention, misalignment may occur as a result of eccentric forces and/or transverse forces. Such misalignment might cause damage to the balls and raceways of the nut and the screw, which are rather vulnerable to such loadings. According to the invention, this problem can be alleviated in case the outwardly facing surfaces of sleeve flange and the nut flange are curved in axial cross section, so as to allow swivelling or tilting of said nut and sleeve due to misalignment forces.

The screw/nut unit, as well as the drive unit including rotor and possible reduction means, may now move in unison so as to adapt to the misalignment.

A very stable embodiment is obtained in case the nut has a nut extension extending beyond the nut flange and inside the support abutment, the sleeve having an axially extending support part which is accommodated between said nut extension and the support abutment.

According to a preferred embodiment, the actuating head engages the screw through a rolling element bearing. Said rolling element bearing is integrated with the actuating head. A further improvement concerning stability is obtained in case the actuating head is accommodated in a cylinder, which is held non-rotatably in the bore.

The sleeve may comprise a sheet metal part which is provided with the inner reaceway of at least one support bearing for rotatably supporting the rotor; alternatively, a separate bearing may be mounted with its inner ring on said sleeve.

For ease of handling and assembly, the sleeve and the nut are clampingly preassembled.

The sleeve may furthermore comprise an inwardly extending flange at its end opposite the sleeve flange, which flange carries a gear wheel of the gear reduction mechanism.

The invention will be explained further with reference to an embodiment shown in the figures.

Figure 1:
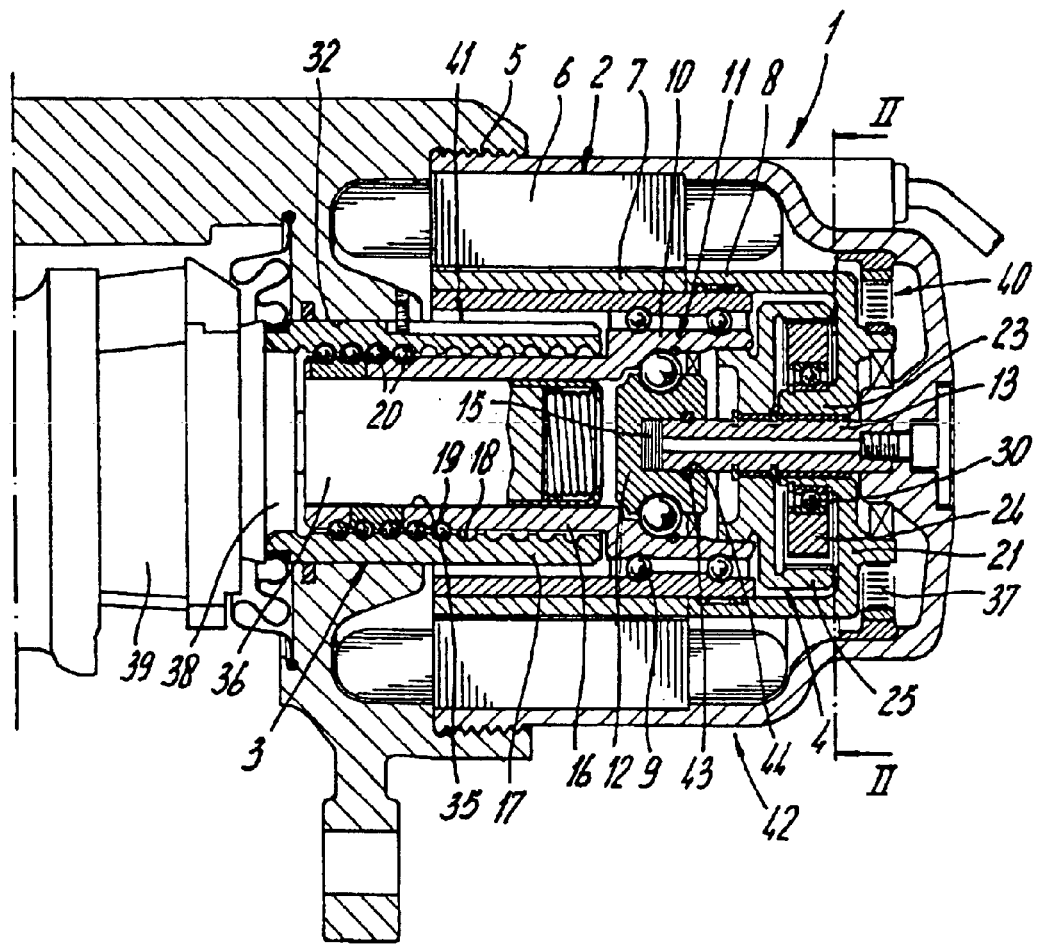
FIG. 1 shows a longitudinal section of a brake calliper comprising an actuator according to the invention.

The actuator according to the invention comprises a housing 1, containing an electric motor 2, a gear reduction mechanism 4 and a screw mechanism 3. The housing at its one end comprises an external screwthread 5, by means of which the actuator can be connected to e.g. a brake calliper in the case of a disc brake application.

The stator 6 of the motor 2 is connected to the housing 1, the rotor 7 of the motor is supported on a sleeve 8. This sleeve 8, by means of ball bearings 9, is in turn supported with respect to the outer ring 10 of a bearing 11. The inner ring 12 of said bearing 11 is supported on a central support shaft 13, connected to the housing 1.

The central support shaft 13 engages the housing 1 through a load cell 15, and is snapfitted by means of clipring 43 accommodated in the groove 44 of the inner ring 12.

The outer ring 10 of the bearing 11 is integrated with screw 16 of screw mechanism 3. This screw 16 is thus rotatably supported with respect to the housing 1. The nut 17 of the screw mechanism 3 is slidably, but not rotatably connected with respect to the housing. Through the screwthreads 18, 19 and balls 20, the rotary motion of the screw 16 is converted into a linear motion of the nut 17, which is contained in a cylinder space 32 in the housing 1.

According to the invention, the rotor 7 and the sleeve 8 carry an inwardly directed flange 21, which carries an excentric hub 23.

The excentric hub 23 rotatably supports a gear wheel 24 through bearing 30, the outer teeth of which gear wheel 24 engage the inwardly directed teeth of the ring gear 25.

The outer diameter of the gear wheel 24 is smaller than the internal diameter of the gear ring 25, such that over certain distance the circumferences of these gear members engage each other. At the opposite circumferential parts, they are not in engagement, which means that the gear 24 is able to excentrically rotate with respect to the gaer ring 25.

In this manner, a great reduction of the rotor 7 is obtained.

Figure 3:
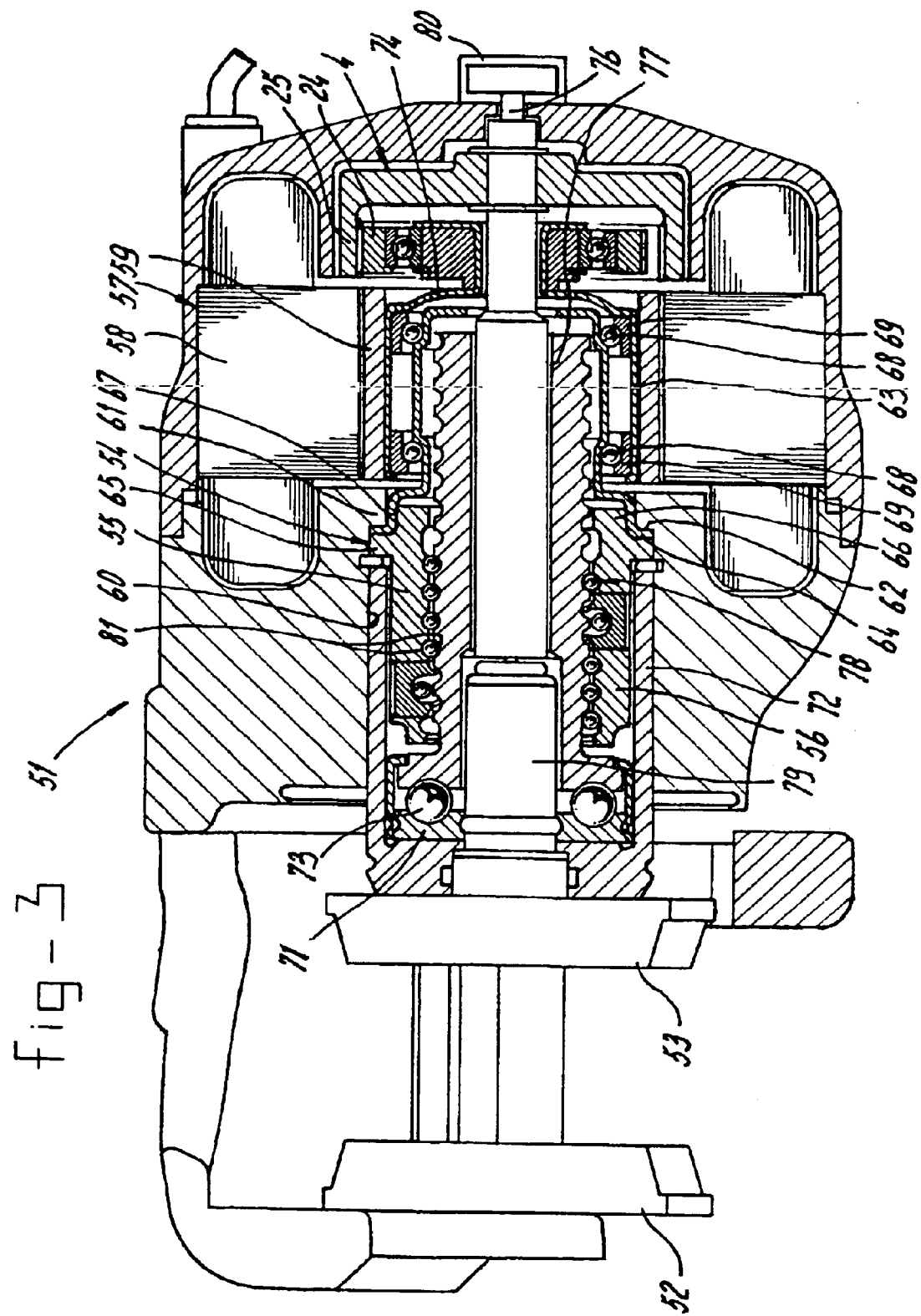
FIG. 3 shows a further embodiment.

The housing 51, shown is FIG. 3 comprises a screw actuator having a nut 55, which by means of balls 78 rotatably supports a screw 56. The nut 55 and screw 56 have appropriately shaped scew type grooves 81.

The electric motor 57 has a stator 58 connected to the housing 51, as well as a rotor 59 which through bearings 69 is rotatably supported on a sleeve 63. That sleeve 63 comprises a raceway 68 for the bearings 69. In the alternative, the sleeve may of course carry the inner rings of separate bearings.

Said rotor sleeve 63 has an outwardly extending sleeve flange; which is held between a radially inwardly extending support abutment 61 of the housing 51, as well as an outwardly extending nut flange 65.

Said outwardly extending nut flange 65, as well as the sleeve flange 64 are sitting within the bore 60 in the housing 51. The support abutment 61 extends radially inwardly with respect to the wall of the bore 60.

Non-rotatably held within the bore 60 is a cylinder 72, within which an actuating head 71 is accommodated. Through ball bearing 73, that actuating head 71 engages the screw 56 of the screw actuator 54.

Figure 2:
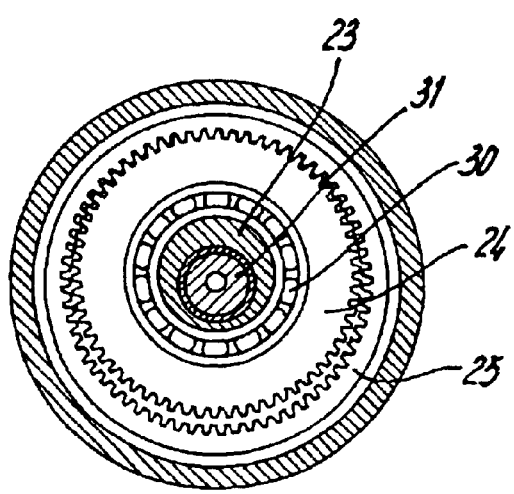
FIG. 2 shows a cross-section according to II—II of FIG. 1.

By actuating the motor 57, the rotor 59 drives the screw 56 of the screw actuator 54, via the shaft 76. Said shaft 76 is connected on the one hand to the excentric reduction gear mechanism 4 according to FIGS. 1 and 2, which is driven by the rotor 59 through the rotor sleeve 63 and the inwardly extending flange 74 thereof.

On the other hand, central drive shaft 76 extends into a bore 77 of the screw 56, which shaft 76 is non-rotatably coupled to the screw 56 through a spline/groove mechanism.

As a result, the screw 56 is rotated and moved outwardly, so as to bring the brake pad 53 closer to brake pad 52 for exerting a braking effect on a brake disk (not shown).

As a result of the compressive forces thereby exerted on the nut 55, the support 63 is held firmly clamped against the support abutment 61 of the housing 51.

With the aim of accommodating misalignments, which might cause harm to the raceways and balls of the screw actuator, the sleeve flange 64 as well as the nut flange 65 may be curved preferably along the surface of an imaginary sphere, so as to allow some adaptation of the screw actuator 54 together with the rotor 59 and reduction mechanism 70.

The screw 56 can be driven by means of an auxiliary drive, e.g. a hand brake drive 80, connected to drive shaft 76.

What is claimed is:

1. An actuator for actuating a brake mechanism comprising a housing, which contains a motor and a screw mechanism that is engageable with the brake mechanism, said screw mechanism comprising a screw and a nut one of which is rotatably supported with respect to the housing, and a gear reduction mechanism connecting a rotor of the motor to at least one of the rotatable screw and the nut, said gear reduction mechanism comprising at least a concentric gear ring with radially inwardly directed teeth, an eccentrically positioned gear wheel having radially outwardly directed teeth wherein the outer diameter of the gear wheel is smaller than the inner diameter of the gear ring, such that the teeth of said gear wheel and gear ring engage each other along a part of their circumferences, and at an opposite part of their circumferences are out of engagement, said eccentric gear wheel being rotatably accommodated on an eccentrically shaped hub which is connected to the rotor of the motor, wherein the gear ring is integrated with the screw of the screw mechanism, said screw being rotatably supported with relation to the housing.

2. Actuator according to claim 1, wherein the rotor of the motor is rotatably supported on an outer ring of a support bearing, said outer ring being integrated with the screw and the gear ring.

3. Actuator according to claim 2, wherein the rotor by means of a radially inwardly extending flange is connected to the eccentrically shaped hub.

4. Actuator according to claim 3, wherein a positive back-drive mechanism is connected to the flange and the housing.

5. Actuator according to claim 4, wherein the positive back-drive mechanism is a spiral spring.

6. Actuator according to claim 1, wherein the eccentric gear wheel is rotatably supported with respect to the eccentrically shaped hub by means of a rolling element bearing.

7. Actuator according to claim 1, wherein the motor is an electric motor, the stator of which is connected to the housing.

8. Actuator according to claim 1, wherein the gear reduction mechanism is at the end of the screw mechanism opposite the end thereof engaging an actuating means for a brake pad.

9. Actuator according to claim 1, wherein the screw of the screw mechanism is rotatably supported by means of a support bearing with respect to a central support shaft, the gear ring and the gear wheel of the reduction gear mechanism surrounding said central support shaft.

10. Actuator according to claim 1, wherein the screw has a bore containing a lubricant reservoir.

11. Actuator according to claim 1, wherein the gear reduction mechanism and a positive backdrive mechanism are contained in a gear reduction module.

12. Actuator according to claim 1, wherein the gear reduction module comprises a central support shaft for supporting the screw mechanism.

13. Actuator according to claim 1, wherein the screw mechanism, a support bearing for supporting the screw mechanism, the rotor of the motor as well as a bearing for supporting the rotor on the screw mechanism are contained in a actuator module.

14. Actuator according to claim 1, wherein the housing, the stator and electric connections for the motor are contained in a housing module.

15. Brake caliper, comprising a claw piece with at least two brakes, and an actuator according to claim 1.

* * * * *